April 27, 1943. R. ULLMAN 2,317,701
MEASURING INSTRUMENT
Filed Jan. 31, 1940
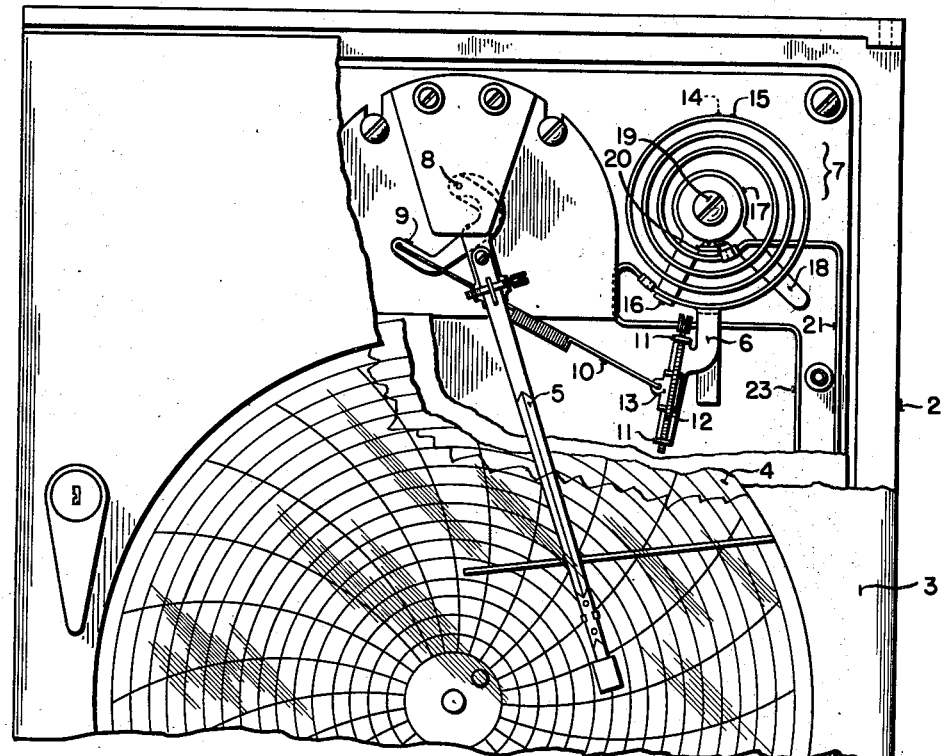
FIG. 1.
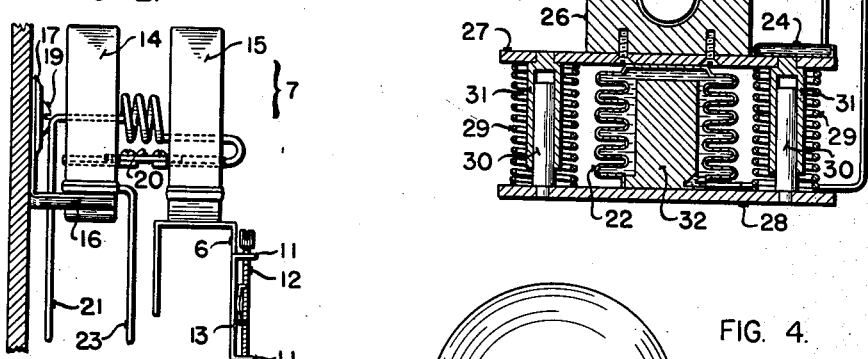
FIG. 2.
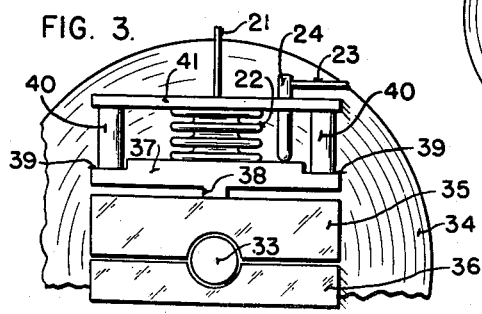
FIG. 3.
FIG. 4.
INVENTOR.
ROY ULLMAN
BY George M. Munnebaugh
ATTORNEY Patented Apr. 27, 1943

2,317,701

UNITED STATES PATENT OFFICE 2,317,701

MEASURING INSTRUMENT

Roy Ullman, Roslyn, Pa., assignor to The Brown Instrument Company, Philadelphia, Pa., a corporation of Pennsylvania Application January 31, 1940, Serial No. 316,590

5 Claims. (Cl. 265—47)

This invention relates to measuring apparatus, and more particularly to force or pressure measuring apparatus.

An object of the invention is to provide a measuring system including a recording and/or controlling element operated by a remotely located condition responsive element, in which improved means are provided to compensate for temperature changes at any part of the system.

A further object of the invention is to provide a system for measuring differential conditions, which is self-compensating for changes in ambient temperature betweeen the condition responsive elements and the recording element.

Remote indicating measuring systems have been provided wherein changes in ambient temperatures were compensated by structural modifications of the condition responsive element or of the means connecting it to the recording element. Condition responsive elements embodying such modifications were usually found to be less sensitive than uncompensated ones of similar types. Accordingly, further modifications of the condition responsive elements were made to secure the desired sensitivity. Such changes usually resulted in structures which were complicated and delicate. These difficulties are avoided in the present invention by providing a temperature compensating device which is separate from the condition responsive device, the resultant movement of the two being used to actuate the recording element.

Although I have shown and described my invention as applied to a recording mechanism, it will be readily understood that it might with equal facility be applied to indicating or controlling apparatus.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

Of the drawing:

Fig. 1 shows an embodiment of my invention as adapted to a system for recording the weight of a loaded shaft;

Fig. 2 is a side view of the part of the recording mechanism which combines the effects of the temperature compensating device and the condition responsive device, and applies the resultant movement to a lever for operating the pen arm;

Fig. 3 shows another embodiment of the condition responsive means of my invention, wherein it is used to measure upward pressure of a shaft against its bearing; and Fig. 4 shows another arrangement of the condition responsive means and temperature compensating means of my invention;

Figure 1 shows a recording instrument constructed in accordance with my invention, mounted in a case 2 having a door 3, part of which is broken away to reveal the interior construction. The instrument is provided with a record chart 4 driven by any suitable mechanism (not shown), across which a pen arm 5 is moved in accordance with the movements of a bracket 6 which is mounted on one end of a double spiral Bourdon tube assembly indicated generally at 7. The pen arm 5 is rigid with a shaft 8, to which is also attached an arm 9. The end of arm 9 is connected to bracket 6 by a link 10. The bracket 6 is provided with wings 11 in which a screw adjusting member 12 is journalled. A U-shaped slider member 13 is provided with ends that engage the threads of the screw 12, and pivotally receives the end of link 10 so that by turning the screw 12, the end of link 10 is moved along the bracket 6 for adjustment purposes. The farther the slider 13 is from the center of the spiral tube device 7, the longer the arc it will move through for a given deflection of the spiral. Therefore, the slider position determines the amount of pen movement for a given movement of the spiral.

The double spiral Bourdon tube device 7 comprises a spiral Bourdon tube 14, hereinafter termed the compensating spiral, and a second similar tube 15, hereinafter termed the measuring spiral. The compensating spiral 14 is attached at its outer end to a bracket 16 that is in turn attached to a support 17 having an arm 18. The bracket 16 and support 17 are fastened by a screw 19 to the back wall of case 2. In adjusting the instrument the screw 19 is loosened, and the spiral 14 is rotated by means of arm 18 to its proper position, after which the screw 19 is again tightened to hold the spiral rigidly in place.

The inner end of the measuring spiral 15 is rigidly attached to the inner end of spiral 14 by a connecting piece 20. The bracket 6 is attached to the outer end of the measuring spiral 15. Each change in size of the spiral 14 will bodily move spiral 15 and every movement of the outer end of spiral 15 will be transmitted through the linkage previously described to the pen arm 5, thus making a record on the chart 4.

The inner end of measuring spiral 15 is connected by a capillary tube 21 to the interior of a condition responsive unit 22, shown herein as a bellows, and the entire system is filled with some temperature responsive medium such as mercury. Therefore, any changes in pressure to which the bellows 22 is subjected will cause expansion or contraction of the spiral 15.

The compensating spiral 14 is connected at its outer end by a capillary tube 23 with the interior of a temperature sensitive bulb 24, mounted near the condition responsive unit 22, and this system is also filled with some temperature responsive medium. Therefore, temperature changes which occur at the location of bulb 24 as well as ambient temperature changes which occur anywhere in the system cause expansion and contraction of the spiral 14, and a corresponding movement of its inner end. Because of connection 20 spiral 15 will be moved bodily in the same direction. However, the same temperature change, acting on the measuring spiral, will cause its outer end to move an equal amount in the opposite direction, so that the temperature change has no net effect on the position of bracket 6.

The bellows 22 is shown in Figure 1 as adapted to measure the load applied by a shaft 25 to a bearing 26. The bearing 26 is attached to a beam 27 whose weight is supported on a base 28 by two springs 29, which are constructed so as to deflect in proportion to the stress placed on them. The springs 29 are held in position by studs 30 attached to the base 28, which pass through the centers of the springs and are received in sleeves 31 attached to the beam 27. The bellows 22 is attached to the base 28 between the springs 29, with its top in contact with beam 27, and along with a block 32, also attached to the base 28 within the bellows 22, forms a chamber to be filled with mercury. The block 32 also serves to limit the compression of the bellows. The temperature responsive bulb 24 is shown as mounted on the beam 27, but may be placed at any suitable nearby location. As the load on shaft 25 increases, the deflection of spring 29 increases, causing an increase in pressure inside bellows 22 which is transmitted through capillary tube 21 to measuring spiral 15, thus causing movement of pen arm 5 to record the increase on chart 4. Any change in temperature of the system that may cause an inaccurate reading is compensated for by bulb 24 and spiral 14.

Figure 3 shows the application of the condition responsive and temperature compensating means of my invention to measure the upward force on a shaft 33 which may, for instance, be the shaft of an upper roll 34 of a rolling mill. The shaft 33 is journalled in a bearing 35 set in the frame 36 of the mill. Above the bearing 35 is placed a deflecting beam 37, having a shoulder 38 centrally located on its lower surface and recesses 39 at each side of its upper surface. Blocks 40 fit into the recesses 39 and support, above the beam 37 and spaced therefrom, a fixed stationary plate 41.

The bellows 22 is located centrally of the space between deflecting beam 37 and plate 41, and the bulb 24 rests on the beam 37 beside it. When an upward force is applied to the shaft 33 due to material passing between the rolls it is transmitted through the bearing 35 to the center of deflecting beam 37. This upward force, in combination with the resulting downward reactive force acting through the blocks 40 at the sides of plate 37, tends to deflect the center of plate 37 upward. As in the case of springs 29, the plate 37 must be so constructed that its deflection is proportional to the stress placed upon it. That being the case, the deflection may serve as a measure of the force acting on the roll shaft 33, and the latter may be recorded in the same manner as the load on shaft 25 is recorded by the device of Figure 1.

Figure 4 shows the application of my invention to the measurement of the force applied to a shaft 42 which is supported in a bearing 43 mounted at the end of a cantilever spring 44. Except for the different type of spring mounting used, the action of this mechanism is the same as that of Figure 1, and the same limitations of spring construction apply.

While I have shown and described my invention as applied to the measuring of stresses on shafts, it will be apparent to those skilled in the art that it may be applied to the measurement of any condition where a temperature compensation is desired. It will also be apparent that the device I have disclosed is essentially an instrument responsive to the difference of two conditions, one being applied to the instrument through capillary 21 and the other through capillary 23. When used as a differential instrument, the device will record the algebraic sum of the conditions to which the bulbs 22 and 24 are subjected.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. A compensated pressure measuring system comprising in combination, an exhibiting element, means jointly operating to move the same comprising a pair of axially aligned Bourdon tubes, one attached to the other, a stationary support, an expansible element mounted on said support and adapted to be subjected to variable pressures, transmission means between said expansible element and one Bourdon tube, a temperature responsive member mounted adjacent said expansible element and subjected to the temperature thereof, and means to connect said temperature responsive element to the second Bourdon tube.

2. In a compensated pressure measuring instrument, the combination of a stationary support, an expansible element attached to said support, means to apply a variable pressure to said element to vary its size, a temperature responsive member mounted adjacent said expansible element, an exhibiting element, and means to operate said exhibiting element in joint response to the pressure applied to said expansible element and said responsive member, the last means comprising separate parts individually responsive to the operation of said expansible element and responsive member.

3. A compensated pressure measuring instrument comprising a complete pressure responsive system consisting of a pressure responsive sending element, a receiving element and a connection between the two, whereby pressures to which said sending element is subjected will be applied to the receiving element, a complete temperature responsive system comprising a temperature responsive sending member, a receiving member and a connection between the two, whereby the receiving member will be moved in proportion to temperature changes to which the sending member is subjected, means to mount said sending member adjacent said sending element so that the former will be subjected to the temperature of the latter, an exhibiting element, and means operated by movement of said receiving element and of said receiving member to move said exhibiting element.

4. A compensated pressure measuring instrument to measure the force exerted by the axis of a roll comprising a closed pressure responsive system having as a part thereof an element subjected to the force applied to the roll, an exhibiting element, means operated by said system proportional to the force exerted on the element to adjust said exhibiting element in accordance therewith, temperature compensating means for the pressure system comprising a closed system including a temperature responsive member mounted adjacent said element and subjected to the temperature thereof, and means operated by said temperature system to adjust the reading of the pressure system.

5. A compensated pressure measuring instrument comprising a complete pressure measuring system consisting of a pressure responsive sending element, a spiral Bourdon tube receiving element having a first end and a second end, and a connection between the sending element and said first end of said receiving element whereby pressures to which said sending element is subjected will be transferred to said receiving element to cause movement of the second end thereof, an exhibiting arm connected to and moved by said second end, a complete compensating temperature responsive system comprising a temperature responsive sending member, a spiral Bourdon tube receiving member having a first end and a second end, connecting means between said sending member and said first end of said receiving member whereby temperature changes to which said sending member is subjected will produce movement of the second end of said receiving member, means to attach the first end of said receiving member to a stationary support and means to support said receiving element entirely on said receiving member by means to attach the first end of said receiving element to the second end of said receiving member whereby movement of said second end of said receiving member will produce bodily movement of said receiving element.

ROY ULLMAN.